(No Model.)
C. R. WILSON.
HORSE DETACHER.
No. 400,156. Patented Mar. 26, 1889.
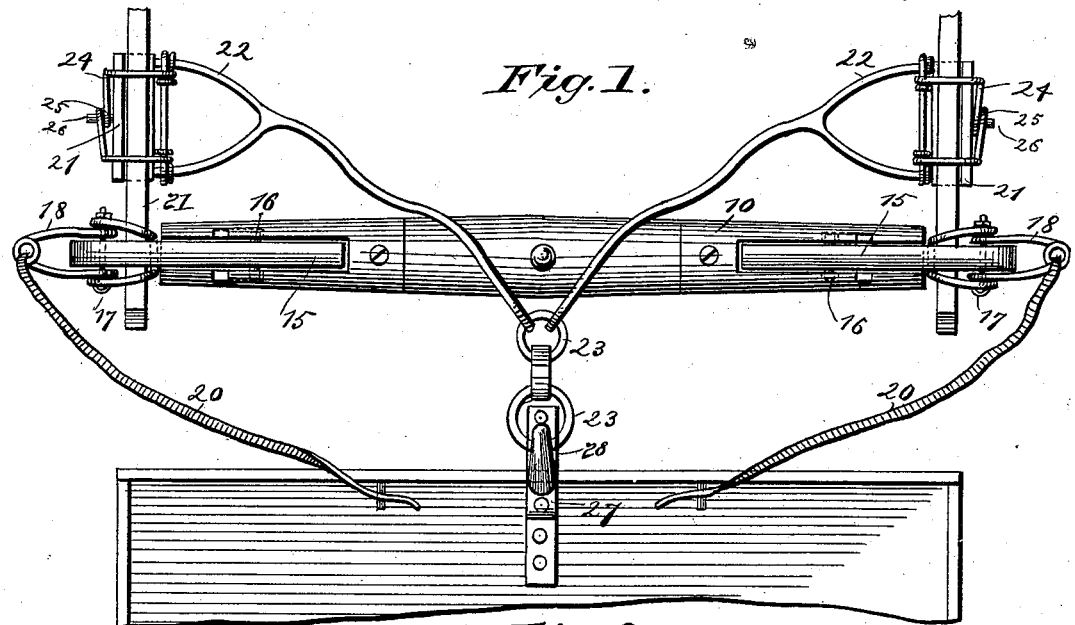
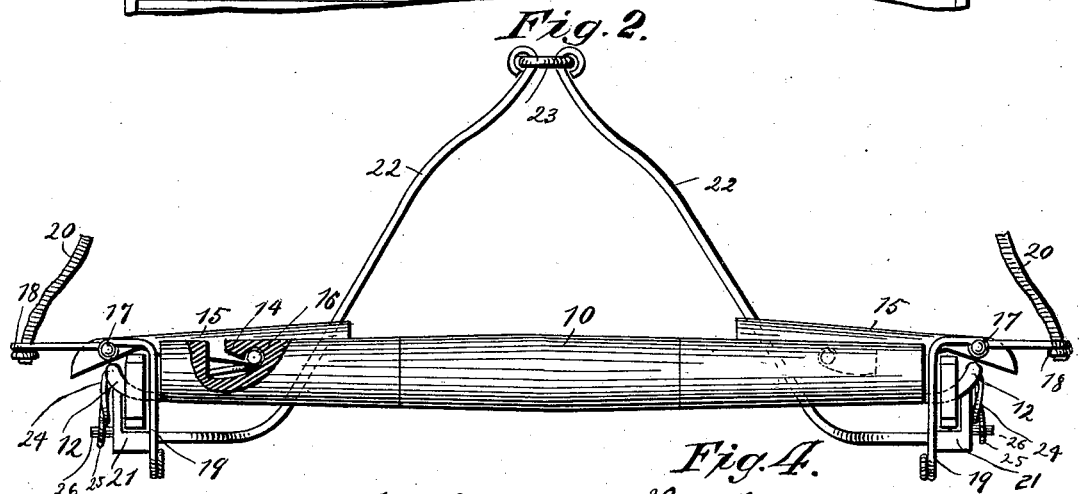
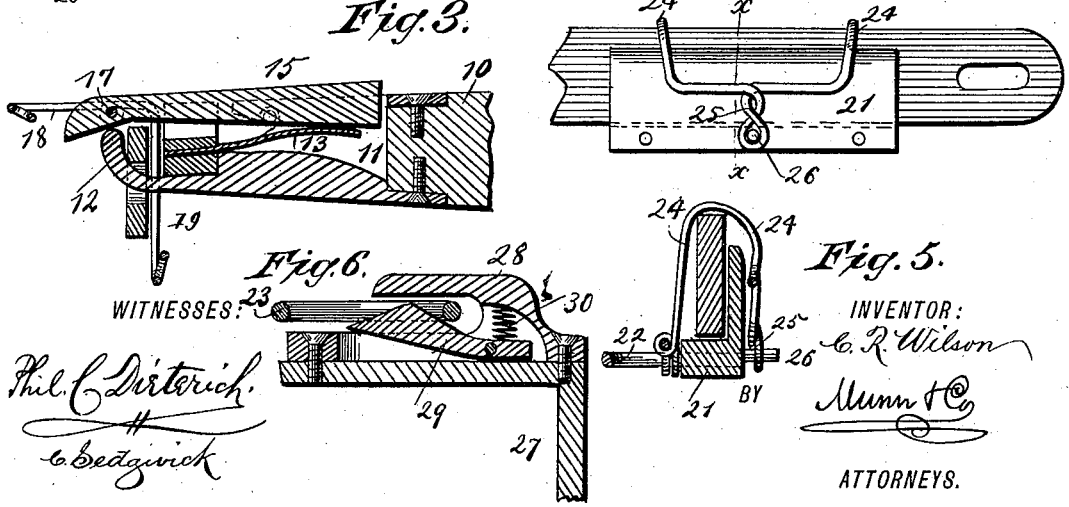
WITNESSES:
Phil. C. Dieterich
C. Sedgwick
INVENTOR:
C. R. Wilson
BY Munn & Co.
ATTORNEYS.
N. PETERS, Photo-Lithographer, Washington, D. C.

UNITED STATES PATENT OFFICE.

CHARLES R. WILSON, OF BEAR WALLOW, KENTUCKY.

HORSE-DETACHER.

SPECIFICATION forming part of Letters Patent No. 400,156, dated March 26, 1889.

Application filed November 30, 1888. Serial No. 292,213. (No model.)

*To all whom it may concern:*

Be it known that I, CHARLES R. WILSON, of Bear Wallow, in the county of Barren and State of Kentucky, have invented a new and Improved Trace Detacher and Attacher, of which the following is a full, clear, and exact description.

My invention relates to an improvement in trace detachers and attachers, and has for its object to provide for the attachment of a singletree of simple and durable construction and a means whereby the trace-straps may be released from connection with the singletree at will by the driver, thereby releasing the horse should the animal become unruly and attempt to run away; and a further object of the invention is to provide a means whereby the traces may be attached without leaving the seat of the vehicle, when so desired.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a plan view of the singletree, illustrating the application of my invention thereto. Fig. 2 is a rear elevation of the same, the singletree being partially broken away. Fig. 3 is a central vertical section through one end of the singletree. Fig. 4 is a side elevation of the trace-holder. Fig. 5 is vertical section taken on the line *x x* of Fig. 4; and Fig. 6 is a central vertical section through the outwardly-extending arm of the locking device adapted for attachment to the vehicle, also for the holdbacks.

The singletree is provided at each end with a vertical recess, 11, and the extremity 12 of the singletree is reduced and carried upward to form, essentially, a hook, as is best illustrated in Figs. 2 and 3, the said hook 12 being projected in a line with the longitudinal axis of the singletree from the lower side. In the recess 11, preferably at the outer end, one end of a spring, 13, is secured, the other end of the said spring being carried inwardly, as best illustrated in Fig. 3. In the side walls of the recess 11 an under-cut, 14, is provided, the under-cut in one side wall aligning with the equivalent cut in the opposite wall.

A lock-lever, 15, is provided with attached trunnions 16, which trunnions are journaled in the under-cuts 14 of the singletree, as best illustrated in Fig. 2. The lever 15 constitutes a top or cover for the recesses 11, and the under surface of the lever is made to bear upon the inner or free end of the spring 13, as best shown in Fig. 3. The outer end of the lever 15 is made to project beyond and over the singletree-hooks 12, and the outer end of the said lever upon the under side is inclined downward in order that ample space may be obtained for the trace between the hook 12 and the outwardly-projecting end of the lever 15, and at the same time that the inclined surface of the lever may bear upon the outer end of the hook, as best shown in Fig. 3, which is the normal position of the lever, and retains the trace in place.

Upon the outer end of the lock-lever 15 a releasing-lever, 17, is fulcrumed. The said releasing-lever 17 is an angle-lever, and consists, preferably, of a strong wire bent upon itself to form an outer bow, 18, which bow is centrally pivoted at each side of the lock-lever and extends horizontally inward, essentially in contact with the outer end of the singletree proper, as best shown in Figs. 1 and 2. The wire is then bent at a right angle and carried downward at each side of the hook 12 to a point below the same, where the ends of the said wire are united, forming a lower bow, 19. A rope, strap, or chain, 20, is secured to the outer extremity of the upper bow of the releasing-lever, which rope, strap, or chain is carried inward in any approved manner over the dash-board and within convenient reach of the driver, as best shown in Fig. 1.

In attaching the trace to the singletree the hook 12 at each end of the singletree is made to pass through one of the trace-apertures, the releasing-lever being held in its normal position illustrated in Fig. 2, in which the vertical member or lower loop of the lock-lever will be seen contiguous to the inner face of the trace-strap. The spring 13, contained in the recesses of the singletree, acting upon the lever 15, causes the said lever, as aforesaid, to bear upon the upper end of the hook, whereby the trace is prevented from working off of the latter.

In order to attach the traces to the vehicle without leaving the seat, I use an angled trace-block, 21, provided with essentially V-shaped horizontal arms 22, the members of which arms are rigidly secured to the inner surface of the horizontal member of the trace-block, as best shown in Figs. 1 and 5. The arms 22, supporting the trace-block, are carried in the direction of the dash-board over the singletree, and their approaching ends are united by a ring, 23, or an equivalent device. The trace is adapted to rest upon the horizontal member of the trace-block to bear against the vertical member, as best shown in Figs. 1 and 5, and the said trace is held in connection with the said block through the medium of a clamp, 24, which clamp is preferably constructed of spring metal, and the inner ends of the said clamp are attached to the horizontal member of the block, and curved or bowed upward over the top of the vertical member down upon the outer face of the same, terminating in a central eye, 25, as best shown in Fig. 4.

A pin, 26, is secured to the vertical member of the trace-block, adapted to be engaged in the said eye 25, as best illustrated in Figs. 4 and 5. Thus when the clamp is made to engage with the pin 26 it effectually retains the trace in connection with the block. When it is desired to remove the trace from the block, the clamp may be disengaged from the pin and thrown over the vertical member, or the end of the trace may be disengaged from the singletree and be drawn from the block without disengaging the clamp.

To attach the traces to the vehicle without leaving the seat of the same, grasp the arms 22, one in each hand, and place the end of each trace on the under side of the lock-lever 15, as shown in Fig. 3, just above the hook 12. Then by an upward and inward motion the lock-lever 15 is made to rise, and the traces may be readily made to adapt themselves to the hook 12.

If the occupant of the vehicle desires to leave the same, the traces may be, if desired, detached from the singletree by drawing upon the straps 20. Thus, in the absence of the driver, should the horse attempt to run away or become obstreperous any strain exerted by the animal upon the traces will release the trace-supporting arms 22 from attachment with the vehicle-body, as the said arms are only attached to the said body by the clip attachment with the angled bracket 27, hereinafter described.

The angle-bracket 27 is attached in any approved manner to the dash-board of the vehicle, as illustrated in Fig. 1, the horizontal member of which bracket is made to project outward from the top of the dash-board. The said horizontal member of the bracket is provided with a hood, 28. Beneath the hood 28 a lever-arm, 29, is pivoted to the horizontal member of the bracket, and a spring, 30, is made to bear, respectively, upon the upper surface of the lever-arm at or near the inner end and to the rear of the fulcrum behind or against the under contiguous surface of the hood, whereby the outer end of the lever-arm, which is preferably enlarged, is made to bear against the under surface of the hood at the outer end, as best shown in Fig. 6. This position is the normal position of the said lever-arm. The purpose of this construction of the lever-arm is to permit of the admission of the ring or rings 23, uniting the inner extremities of the trace-block arms, the said ring or rings being pressed inward over the lever-arm 29, as best shown in Fig. 6. It will be observed that by reason of this peculiar connection of the trace-block arms with the bracket, should the trace be released from the singletree to release the animal, the animal, starting forward, carrying the trace with him, would readily withdraw the ring 23 from the clamping attachment of the bracket.

In operation it simply becomes necessary, when the animal harnessed becomes unruly and it is desired to release him from the vehicle, to draw upon the strap, rope, or chain 20, whereupon the vertical or lower loop member of the releasing-lever 17 is carried upward and outward, thereby forcing the trace from off the hook 12.

I desire it to be distinctly understood that while specific construction is shown and described other equivalent construction may be employed without departing from the spirit of the invention.

Having thus fully described my invention, I claim as new and desire to secure by Letters Patent—

1. The combination, with a singletree provided with a hook at its ends and a spring-actuated lever bearing upon the said hooks, of an angled releasing-lever pivoted upon the outer extremity of the singletree-lever and extending downward over the hook and horizontally outward from the said singletree-lever, and means, substantially as shown and described, for manipulating the said releasing-lever, as and for the purpose specified.

2. The combination, with a singletree provided at each end with an outwardly-projected and upwardly-curved hook, and a lever pivoted upon the upper surface of the singletree, extending outward beyond the ends of the same over the said hooks, of an angled releasing-lever fulcrumed upon the outer end of the singletree-lever, the vertical member whereof is extended downward at each side of the said hooks, and a horizontal member carried upward over and beyond the hook, and a strap or equivalent device attached to the outer extremity of the said releasing-lever, all combined for operation substantially as shown and described.

3. The combination, with a singletree provided at each end with an outwardly-extending and upwardly-curved hook adapted to receive the trace, a lever pivoted in the upper surface of the singletree, extending over and beyond each hook, and an angled releasing-lever pivoted upon the outer extremity of each singletree-lever, of a trace-holder consisting of angled blocks, arms secured to the said blocks, having their inner ends connected, and a spring-actuated clamping device attached to the trace-blocks, substantially as shown and described.

4. The combination, with a singletree provided at each end with an outwardly and upwardly curved hook, a lever pivoted upon the upper surface of the singletree, extending beyond and over the hook, and an angled releasing-lever pivoted to the outer end of the singletree-lever, passing downward over the hook of the said singletree, of angled trace-blocks, an arm secured to each block, said arms having their approaching ends united and carried over the singletree to the rear, a spring clamping device attached to the said trace-blocks, and a strap, rope, or chain secured to the outer extremity of the releasing-lever, all combined for operation substantially as shown and described.

5. The combination, with a singletree provided at each end with an outwardly and upwardly curved hook, a lever pivoted upon the upper surface of the singletree, extending beyond and over the hook, and an angled releasing-lever pivoted to the outer end of the singletree-lever, passing downward over the hook of the said singletree, of angled trace-blocks, an arm secured to each block, said arms having their ends united and carried over the singletree to the rear, a spring clamping device attached to the said trace-blocks, a strap, rope, or chain secured to the outer extremity of the releasing-lever, an angled bracket adapted for attachment to the dash-board of the vehicle, having a hood secured to the horizontal member of the bracket, and a spring-actuated lever-arm fulcrumed upon the said horizontal member beneath the hood, adapted for the reception of the united ends of the trace-block arms, all combined substantially as shown and described, and for the purpose specified.

CHARLES R. WILSON.

Witnesses:
DAN. T. CURD,
JOHN W. ROYALTY.